United States Patent
Qi et al.

(10) Patent No.: US 12,113,396 B1
(45) Date of Patent: Oct. 8, 2024

(54) FUEL CELL POWERED RING BUS ARCHITECTURES

(71) Applicant: ABB Schweiz AG, Baden (CH)

(72) Inventors: Li Qi, Raleigh, NC (US); Harish Suryanarayana, Apex, NC (US); Silvio Colombi, Losone (CH); Taosha Jiang, Beijing (CN); Yuzhi Zhang, Apex, NC (US); Harry Bye Handlin, Birmingham, AL (US)

(73) Assignee: ABB Schweiz AG, Baden (CH)

( * ) Notice: Subject to any disclaimer, the term of this patent is extended or adjusted under 35 U.S.C. 154(b) by 28 days.

(21) Appl. No.: 18/182,908

(22) Filed: Mar. 13, 2023

(51) Int. Cl.
*H02J 9/06* (2006.01)
*H02J 1/10* (2006.01)

(52) U.S. Cl.
CPC ............... *H02J 9/062* (2013.01); *H02J 1/10* (2013.01); *H02J 9/061* (2013.01); *H01M 2250/10* (2013.01); *H02J 2300/30* (2020.01); *Y02B 90/10* (2013.01); *Y02B 90/20* (2013.01)

(58) Field of Classification Search
CPC ........ H02J 9/061; H02J 9/062; H02J 2300/30; H02J 1/102; H02J 1/12; H02J 1/00; H02J 1/06; H02J 1/10; G06F 1/263; G06F 1/30; H01M 2250/10; Y02E 60/50; Y02B 90/20; Y02B 90/10; Y02B 10/70
See application file for complete search history.

(56) References Cited

U.S. PATENT DOCUMENTS

| | | | |
|---|---|---|---|
| 8,504,215 B1 | 8/2013 | McCorkendale et al. | |
| 8,937,405 B2 | 1/2015 | Park | |
| 8,970,176 B2 | 3/2015 | Ballatine et al. | |
| 9,106,098 B2 | 8/2015 | Srinivasan et al. | |
| 9,490,660 B2 | 11/2016 | Monahan | |
| 9,735,616 B2 | 8/2017 | Colombi et al. | |
| 9,819,192 B2 | 11/2017 | Teichmann | |
| 10,148,122 B2 | 12/2018 | Reddy et al. | |
| 10,203,735 B2 | 2/2019 | Gross et al. | |
| 10,322,637 B2 | 6/2019 | Srinivasan et al. | |
| 10,331,153 B2 | 6/2019 | Fallon | |
| 10,756,546 B2 | 8/2020 | Pmsvvsv et al. | |

(Continued)

FOREIGN PATENT DOCUMENTS

CN 207459824 U 6/2018

OTHER PUBLICATIONS

S. Colombi, "ABB's ring bus with static UPS for critical power applications", ABB Review, Feb. 2019.

*Primary Examiner* — Ryan Johnson
(74) *Attorney, Agent, or Firm* — McCarter & English, LLP

(57) ABSTRACT

In one aspect, a fuel cell power system is provided. The fuel cell power system includes a ring bus, a plurality of bidirectional uninterruptible power supplies (UPSs), a plurality of direct current (DC) fuel cell modules, and a plurality of bidirectional direct current to alternating current (DC-AC) power converters. Each of the plurality of UPSs is electrically coupled to at least one battery, an AC utility feed, a load, and via a choke, the ring bus. Each of the plurality of DC fuel cell modules includes one or more fuel cells coupled to a hydrogen storage. Each of the plurality of bidirectional DC-AC power converters is electrically coupled to a corresponding one of the plurality of DC fuel cell modules and a corresponding one of the plurality of bidirectional UPSs at the AC utility feed.

20 Claims, 11 Drawing Sheets

(56) References Cited

U.S. PATENT DOCUMENTS

| | | |
|---|---|---|
| 10,797,514 B2 | 10/2020 | Gross et al. |
| 2017/0005357 A1* | 1/2017 | Mermelstein ......... H01M 8/186 |
| 2018/0001072 A1 | 1/2018 | Clay et al. |
| 2018/0052431 A1 | 2/2018 | Shaikh et al. |
| 2018/0107260 A1 | 4/2018 | Cifala et al. |
| 2019/0067986 A1* | 2/2019 | Haj-Maharsi ......... H01M 10/46 |
| 2019/0146565 A1 | 5/2019 | Cader et al. |
| 2021/0152016 A1* | 5/2021 | Pmsvvsv ................. H02J 9/061 |

* cited by examiner

FUEL CELL POWERED RING BUS ARCHITECTURES

BACKGROUND

The field of the disclosure relates to ring bus architectures, and more particularly, to utilizing fuel cells as primary power sources in ring bus architectures.

It may be desirable to use one or more fuel cells, for example, hydrogen fuel cells, as a primary source of electrical power for an electrical architecture of a datacenter or other types of critical load infrastructure. One such electrical architecture is an isolated-parallel ring bus (IPRB) architecture. In addition, it may be desirable to provide utility grid support using power generation capabilities when fuels cells are integrated into an IPRB architecture, or other types of electrical architectures, without compromising the reliability of the loads supported by the fuel cells.

BRIEF DESCRIPTION

In one aspect, a fuel cell power system is provided. The fuel cell power system includes a ring bus, a plurality of bidirectional uninterruptible power supplies (UPSs), a plurality of direct current (DC) fuel cell modules, and a plurality of bidirectional direct current to alternating current (DC-AC) power converters. Each of the plurality of UPSs is electrically coupled to at least one battery, an AC utility feed, a load, and via a choke, the ring bus. Each of the plurality of DC fuel cell modules includes one or more fuel cells coupled to a hydrogen storage. Each of the plurality of bidirectional DC-AC power converters is electrically coupled to a corresponding one of the plurality of DC fuel cell modules and a corresponding one of the plurality of bidirectional UPSs at the AC utility feed.

In another aspect, a fuel cell power system is provided. The fuel cell power system includes a ring bus, a plurality of bidirectional UPSs, a plurality of DC fuel cell modules, and a plurality of bidirectional DC-DC power converters. Each of the plurality of UPSs is electrically coupled to at least one battery, an AC utility feed, a load, and via a choke, the ring bus. Each of the plurality of DC fuel cell modules includes one or more fuel cells coupled to a hydrogen storage. Each of the plurality of bidirectional DC-DC power converters is electrically coupled to a corresponding one of the plurality of DC fuel cell modules and a corresponding one of the plurality of bidirectional UPSs.

In another aspect, a fuel cell power system is provided. The fuel cell power system includes a DC ring bus, a plurality of DC fuel cell modules, and a plurality of bidirectional DC-UPSs. Each of the plurality of DC fuel cell modules includes one or more fuel cells coupled to a hydrogen storage. Each of the plurality of bidirectional DC-UPSs is electrically coupled to at least one battery, a corresponding one of the plurality of DC fuel cell modules, and, via the DC ring bus, a load.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
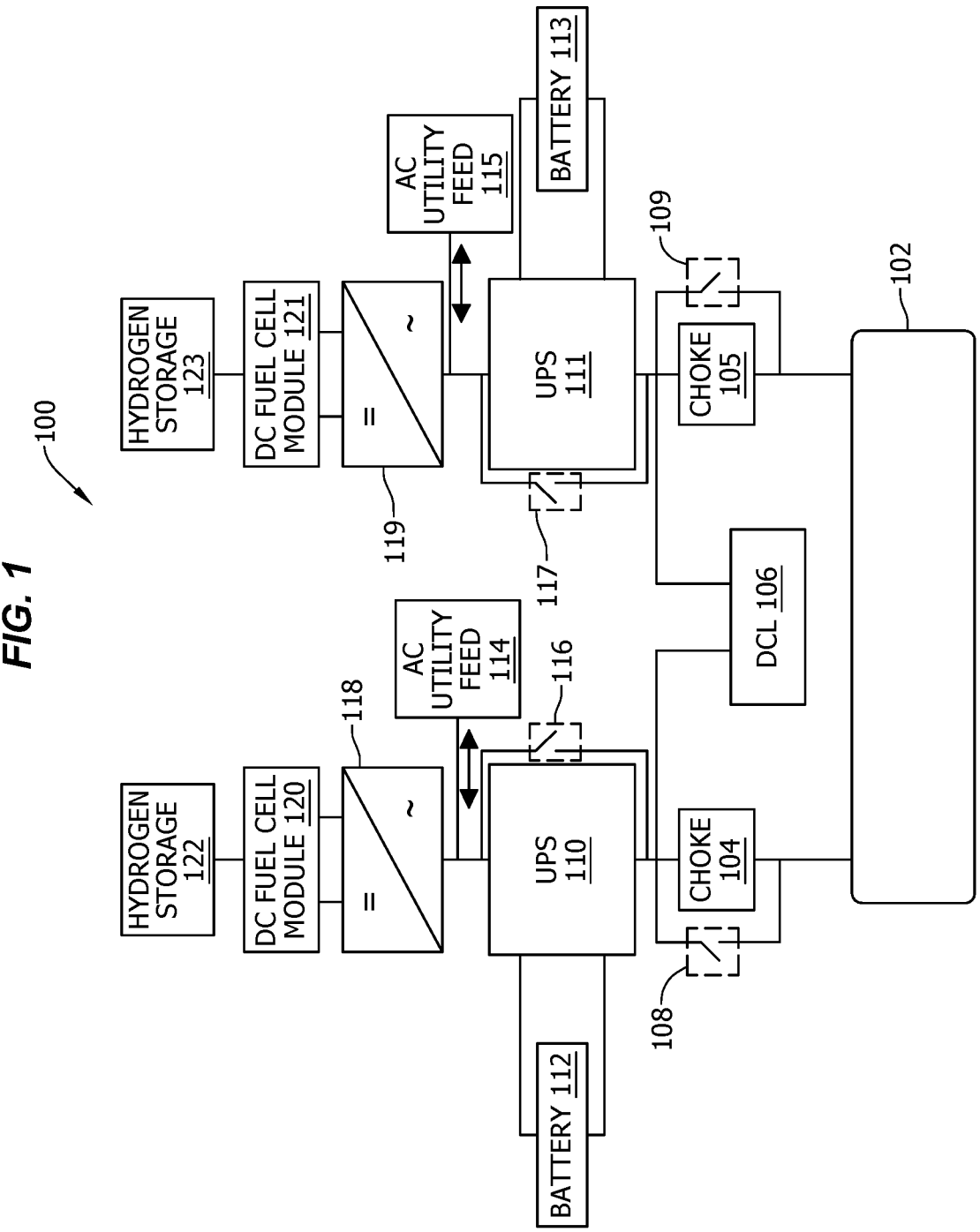
FIG. 1 depicts a block diagram of a fuel cell power system for dual-corded AC loads in an exemplary embodiment.

FIG. 1 depicts a block diagram of a fuel cell power system 100 for dual-corded AC loads in an exemplary embodiment. The fuel cell power systems described herein comprise any component, system, or device that perform the functionality described herein for the fuel cell power systems. Fuel cell power system 100, and subsequent fuel cell power systems, will be described with respect to various discrete elements, which perform functions. These elements may be combined in different embodiments or segmented into different discrete elements in other embodiments In this embodiment, fuel cell power system 100 includes a ring bus 102, which may comprise an IPRB in some embodiments. In this embodiment, fuel cell power system 100 includes chokes 104, 105, which electrically couple a dual-corded load (DCL) 106 to ring bus 102. Each of chokes 104, 105 is coupled in parallel with choke bypass circuit breakers 108, 109, respectively. Ring bus 102 and DCL 106 are powered by UPSs 110, 111, which are bidirectional and are coupled to chokes 104, 105, respectively. UPSs 110, 111 are electrically coupled to one or more batteries 112, 113, respectively, and AC utility feeds 114, 115, respectively. In some embodiments, batteries 112, 113 provide temporary electrical power to UPSs 110, 111 when AC power supplied to UPSs 110, 111 is lost. In other embodiments, batteries 112, 113 provide temporary electrical power to UPSs 110, 111 when providing grid support to an electrical grid via AC utility feeds 114, 115.

In this embodiment, each of UPSs 110, 111 is coupled in parallel with UPS bypass circuit breakers 116, 117, respectively. UPSs 110, 111 in this embodiment are electrically coupled with AC utility feeds 114, 115, and electrically coupled with chokes 104, 105. Thus, UPSs 110, 111 form bidirectional AC-AC UPSs in this embodiment, which may selectively supply AC power to ring bus 102 and/or DCL 106, or provide AC power to AC utility feeds 114, 115 in a grid support mode.

In this embodiment, fuel cell power system 100 further includes DC-AC power converters 118, 119, which are bidirectional. Each of DC-AC power converters are electrically coupled to AC utility feeds 114, 115, respectively, and UPSs 110, 111, respectively. In this embodiment, DC-AC power converters 118, 119 are electrically coupled to DC fuel cell modules 120, 121, respectively. DC fuel cell modules 120, 121 include one or more fuel cells that bidirectionally convert hydrogen and oxygen to DC power. When the DC fuel cell modules 120, 121 utilize hydrogen from hydrogen storage 122, 123, DC fuel cell modules 120, 121 generate DC power, which is converted by DC-AC power converters 118, 119 into AC power. The AC power is provided to UPSs 110, 111. When DC fuel cell modules 120, 121 receive DC power from DC-AC power converters 118, 119, DC fuel cell modules 120, 121 generate hydrogen, which is stored at hydrogen storage 122, 123. The DC power supplied by DC-AC power converters 118, 119 to DC fuel cell modules 120, 121 is generated by converting AC power supplied by AC utility feeds 114, 115 and/or by converting the AC power supplied by UPSs 110, 111. Some examples of the fuel cells within DC fuel cell modules 120, 121 include alkaline fuel cells, proton-exchange membrane (PEM) fuel cells, solid oxide fuel cells (SOFC), etc. In this embodiment, DC fuel cell modules 120, 121 form a primary power source for UPSs 110, 111, and AC utility feeds 114, 115 form a backup or secondary power source for UPSs 110, 111.

Although fuel cell power system 100 depicts that ring bus 102 is powered by two instances of DC fuel cell modules 120, 121, DC-AC power converters 118, 119, UPSs 110, 111, fuel cell power system 100 may include additional instances of DC fuel cell modules 120, 121, DC-AC power converters 118, 119, UPSs 110, 111 arranged in parallel with each other (along with their corresponding chokes, bypass circuit breakers, and hydrogen storage, and utility feeds) for additional reliability and redundancy.

During normal operation of fuel cell power system 100, DC fuel cell modules 120, 121 utilize hydrogen from hydrogen storage 122, 123, and generate DC power, which is supplied to DC-AC power converters 118, 119. DC-AC power converters 118, 119 convert the DC power supplied by DC fuel cell modules 120, 121 into AC power, which is provided to UPSs 110, 111. UPSs 110, 111 provide AC power to DCL 106 and also provide AC power to ring bus 102, via chokes 104, 105. During normal operation of fuel cell power system 100, AC utility feed 114 is a backup or secondary power source for UPS 110, such that AC utility feed 114 may be used to supply AC power to UPS 110 if DC fuel cell module 120 is unable to supply DC power to DC-AC power converter 118. In like manner, AC utility feed 115 is a backup or secondary power source for UPS 111, such that AC utility feed 115 may be used to supply AC power to UPS 111 if DC fuel cell module 121 is unable to supply DC power to DC-AC power converter 119.

During abnormal events, such as a fault at one or more of UPSs 110, 111, DCL 106 may be powered by the remaining UPS 110 or UPS 111, and/or by ring bus 102. For example, if UPS 110 fails, then UPS 111 may provide electrical power to DCL 106. If both UPSs 110, 111 fail, then DCL 106 may be powered by ring bus 102 (via other UPSs, not shown but coupled to ring bus 102 via their respective chokes), and choke bypass circuit breakers 108, 109 may be closed to bypass chokes 104, 105.

Figure 2:
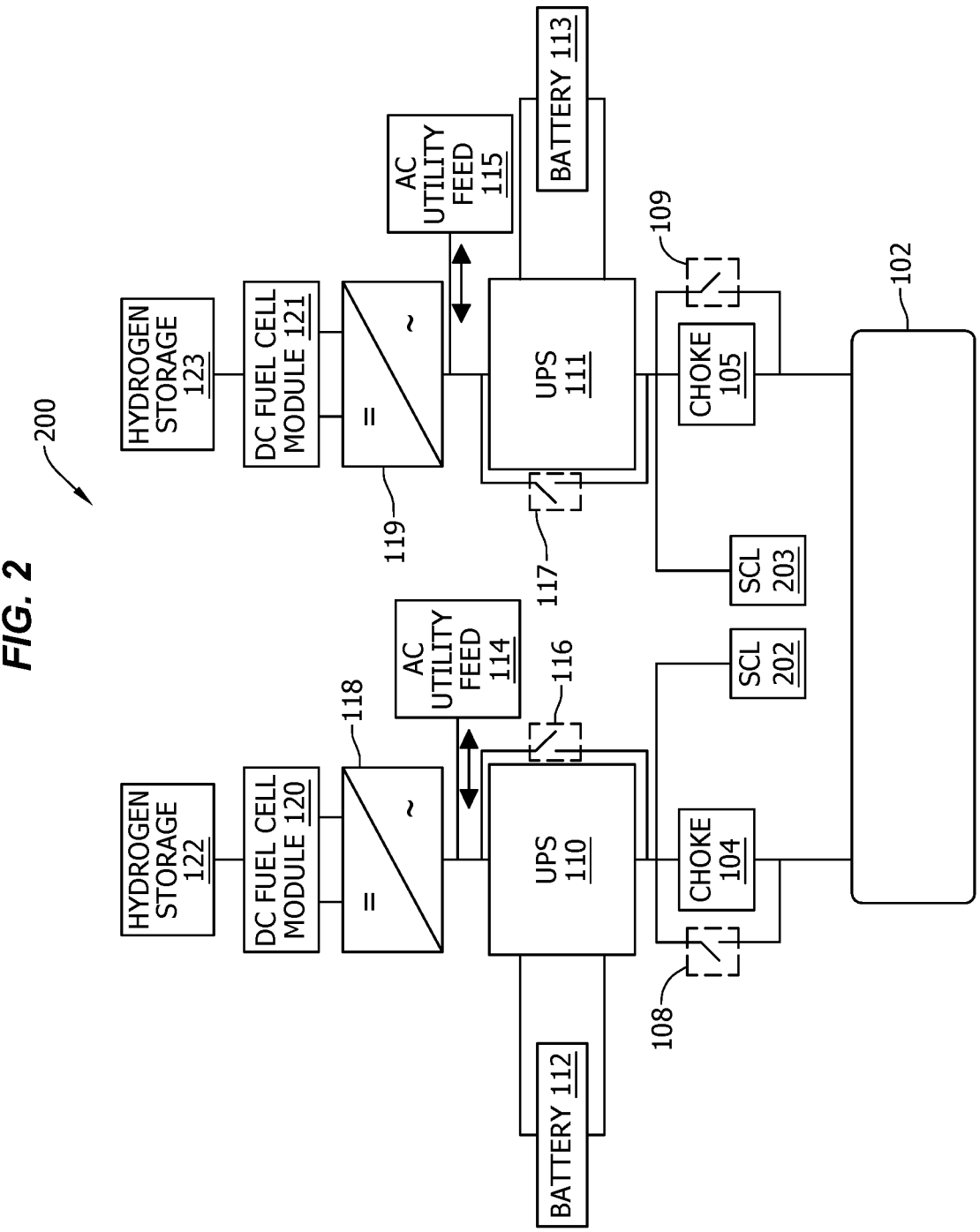
FIG. 2 depicts a block diagram of a fuel cell power system for single-corded AC loads in an exemplary embodiment.

FIG. 2 depicts a block diagram of a fuel cell power system 200 for single-corded AC loads in an exemplary embodiment. Fuel cell power system 200 includes similar components as depicted in FIG. 1 for fuel cell power system 100, with the exception that UPSs 110, 111 are coupled to single-corded loads (SCLs) 202, 203 in fuel cell power system 200.

During normal operation of fuel cell power system 200, DC fuel cell modules 120, 121 utilize hydrogen from hydrogen storage 122, 123, and generate DC power, which is supplied to DC-AC power converters 118, 119. DC-AC power converters 118, 119 convert the DC power supplied by DC fuel cell modules 120, 121 into AC power, which is provided to UPSs 110, 111. UPSs 110, 111 provide AC power to SCLs 202, 203 and also provide AC power to ring bus 102, via chokes 104, 105.

During abnormal events, such as a fault at one or more of UPSs 110, 111, SCLs 202, 203 may be powered by the remaining UPS 110 or UPS 111 via ring bus 102. For example, if UPS 110 fails, then UPS 111 may provide electrical power to SCL 202 via ring bus 102 by closing choke bypass circuit breaker 108. If both UPSs 110, 111 fail, then SCLs 202, 203 may be powered by ring bus 102 (via other UPSs, not shown but coupled to ring bus 102 via their respective chokes), and choke bypass circuit breakers 108, 109 may be closed to bypass chokes 104, 105.

Figure 3:
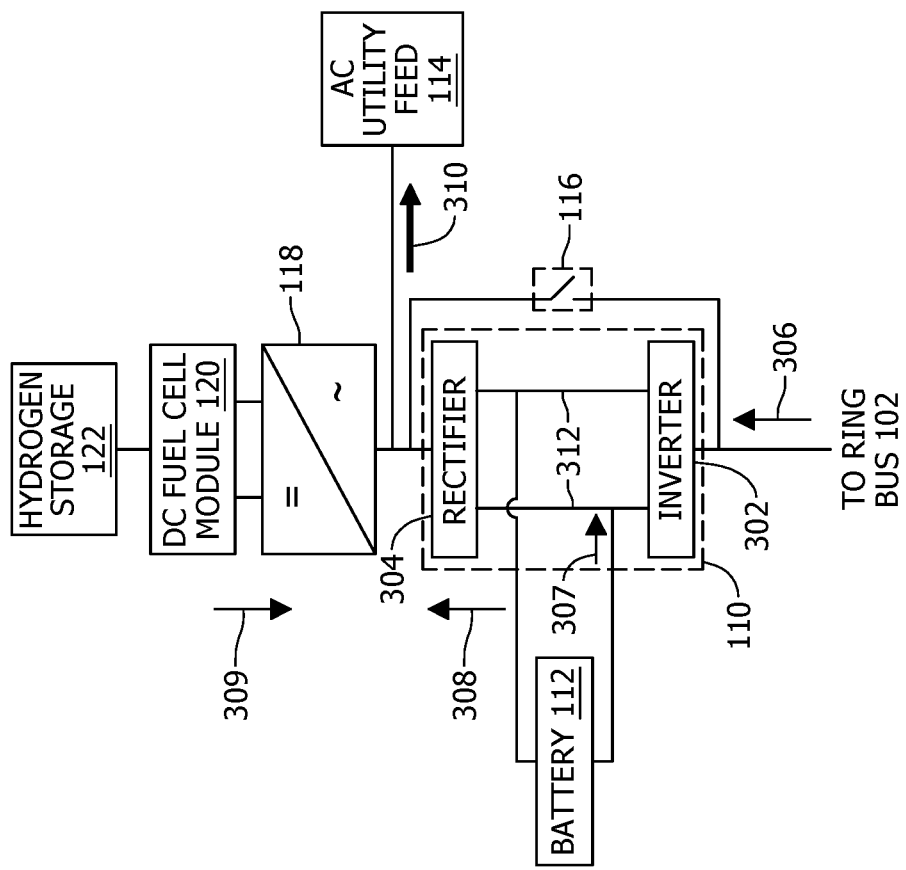
FIG. 3 and FIG. 4 depicts additional details for a portion of the fuel cell power systems of FIGS. 1 and 2 in an exemplary embodiment.
Figure 4:
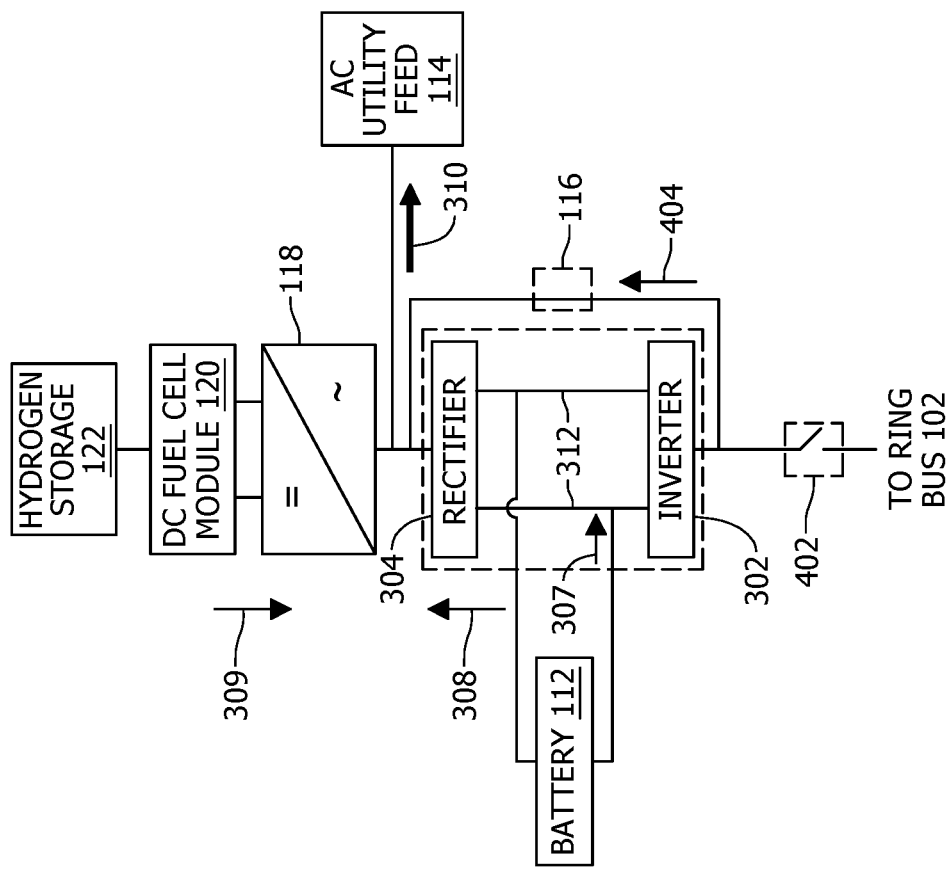

FIG. 3 and FIG. 4 depicts additional details for a portion of fuel cell power systems 100, 200 of FIG. 1 and FIG. 2 in an exemplary embodiment. In particular, FIG. 3 and FIG. 4 depict the operation of UPS 110 in various power delivery configurations. However, the functionality discussed with respect to UPS 110 also applies to UPS 111 and other UPSs coupled to ring bus 102, not shown, along with their corresponding components (e.g., their corresponding batteries, AC utility feeds, power converters, fuel cells, and hydrogen storage).

In the embodiment of FIG. 3, UPS 110 includes an inverter 302, which is bidirectional, and a rectifier 304, which is bidirectional. Inverter 302 is electrically coupled to ring bus 102 and rectifier 304 is electrically coupled to both AC utility feed 114 and DC-AC power converter 118. In this embodiment, UPS bypass circuit breaker 116 is open.

Arrows 306-310 depict the power flow in FIG. 3. Further, both inverter 302 and rectifier are electrically coupled to a common DC bus 312. Ring bus 102 supplies AC power to inverter 302, which converts the AC power to DC power for common DC bus 312, and the DC power is supplied to rectifier 304. Battery 112 also supplies DC power to rectifier 304 via common DC bus 312. Rectifier 304 converts the DC power to AC power, and supplies the AC power to AC utility feed 114 in a grid support mode. The grid support mode may be initiated in response to a trigger. For example, the grid support mode may be initiated at the request of the electrical utility, in response to detecting a frequency droop at AC utility feeds 114, 115, in response to detecting a voltage droop at AC utility feeds 114, 115, etc.

In the grid support mode, DC fuel cell module 120 electrochemically converts hydrogen and oxygen to DC power, which is supplied to DC-AC power converter 118. DC-AC power converter 118 converts the DC power to AC power, which is also provided to AC utility feed 114 in addition to the AC power supplied by UPS 110 and rectifier 304. The AC power supplied to inverter 302 from ring bus 102 is from other UPSs, not shown (e.g., UPS 111), that are electrically coupled to ring bus 102.

In the embodiment of FIG. 4, inverter 302 is not electrically coupled to ring bus 102, because a circuit breaker 402 is open. UPS bypass circuit breaker 116 is closed. DC power supplied by battery 112 to common DC bus 312 is converted to AC power by inverter 302, which supplies AC power to AC utility feed 114 via UPS bypass circuit breaker 116. An arrow 404 depicts the direction of power transfer from inverter 302 to AC utility feed 114. The output of rectifier 304 is electrically coupled to both AC utility feed 114, the output of DC-AC power converter 118, and the output of inverter 302. Battery 112 also supplies DC power to rectifier 304 via common DC bus 312, and rectifier 304 converts the DC power to AC power, and supplies the AC power to AC utility feed 114 in the grid support mode. DC fuel cell module 120 electrochemically converts hydrogen and oxygen to generate DC power, which is supplied to DC-AC power converter 118. DC-AC power converter 118 converts the DC power to AC power, which is also provided to AC utility feed 114 in the grid support mode.

Figure 5:
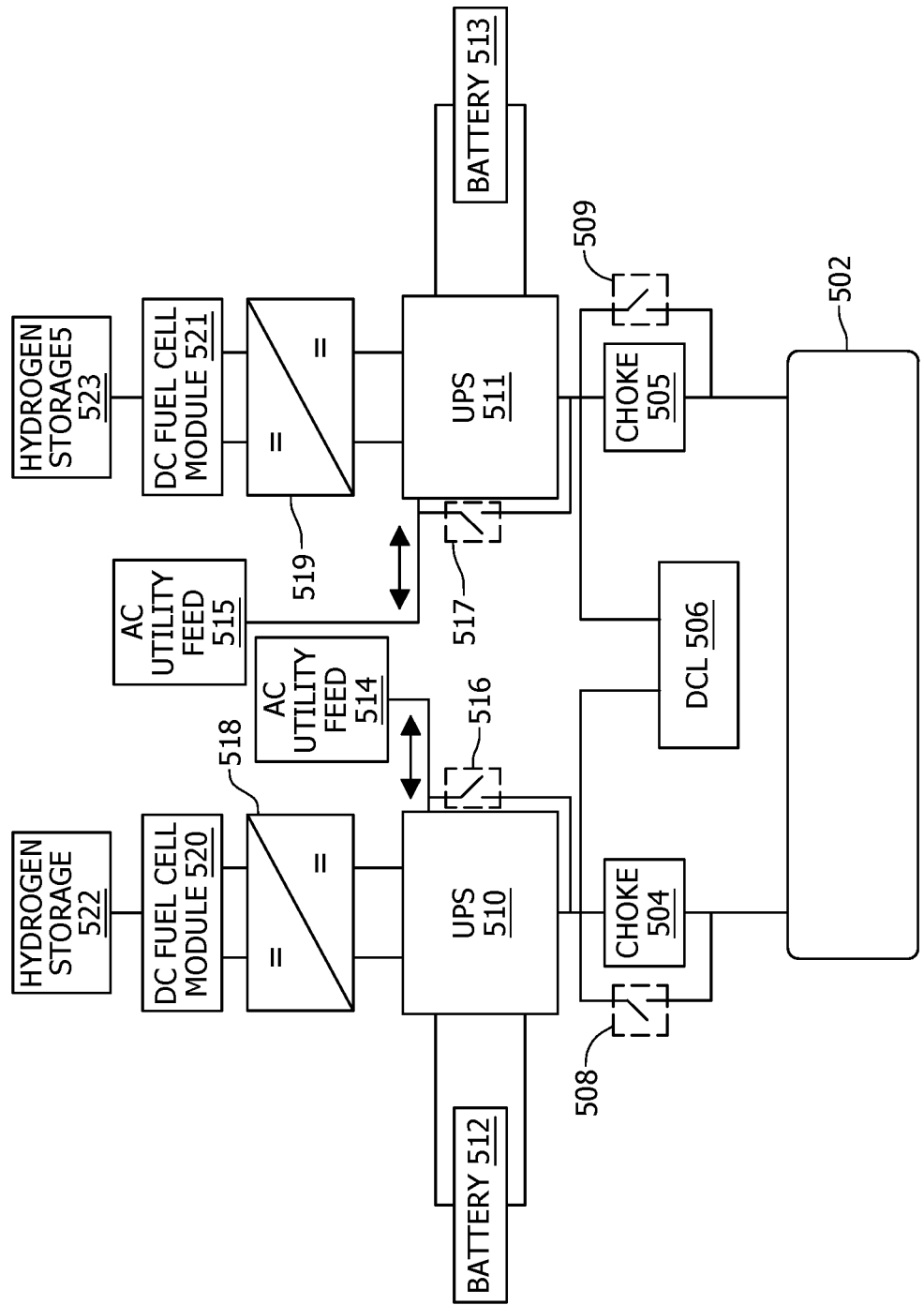
FIG. 5 depicts a block diagram of a fuel cell power system for dual-corded AC loads in another exemplary embodiment.

FIG. 5 depicts a block diagram of a fuel cell power system 500 for dual-corded AC loads in another exemplary embodiment. In this embodiment, fuel cell power system 500 includes a ring bus 502, chokes 504, 505, choke bypass circuit breakers 508, 509, batteries 512, 513, UPS bypass circuit breakers 516, 517, AC utility feeds 514, 515, DC fuel cell modules 520, 521, and hydrogen storage 522, 523, each of which may operate similarly to those previously described in FIGS. 1-4 for their corresponding ring bus 102, chokes 104, 105, choke bypass circuit breakers 108, 109, batteries 112, 113, UPS bypass circuit breakers 116, 117, AC utility feeds 114, 115, DC fuel cell modules 120, 121, and hydrogen storage 122, 123.

In this embodiment, fuel cell power system 500 further includes DC-DC power converters 518, 519, which are bidirectional. DC-DC power converters 518, 519 are electrically coupled to UPSs 510, 511, respectively. In this embodiment, DC-DC power converters 518, 519 are electrically coupled to DC fuel cell modules 520, 521, respectively. Thus, DC-DC power converters 518, 519 form bidirectional DC-DC power converters (e.g., DC-DC power converters 518, 519 implement DC voltage translation) in this embodiment. When DC fuel cell modules 520, 521 utilize hydrogen from hydrogen storage 522, 523, DC fuel cell modules 520, 521 generate DC power at a first voltage, which is converted by DC-DC power converters 518, 519 into DC power at a second different voltage. The DC power supplied by DC-DC power converters 518, 519 is provided to UPSs 510, 511.

In this embodiment, UPSs 510, 511 are electrically coupled to DC-DC power converters 518, 519, respectively. UPSs 510, 511 are also electrically coupled to AC utility feeds 514, 515 and electrically coupled to ring bus 502 via chokes 504, 505. In this embodiment, UPSs 510, 511 comprise multi-port converters, each including a plurality of internal DC-DC and DC-AC power stages, which will be discussed in more detail below.

During normal operation of fuel cell power system 500, DC fuel cell modules 520, 521 utilize hydrogen from hydrogen storage 522, 523, and generate DC power, which is supplied to DC-DC power converters 518, 519. DC-DC power converters 518, 519 convert the DC power supplied by DC fuel cell modules 120, 121 at a first voltage into DC power at a different second voltage, which is provided to UPSs 510, 511. UPSs 510, 511 convert the DC power supplied by DC-DC power converters 518, 519 to AC power, and supply the AC power to DCL 506. UPSs 510, 511 also supply AC power to ring bus 502, via chokes 504, 505. During normal operation of fuel cell power system 500, DC fuel cell modules 520, 521 form a primary power source for ring bus 502, and AC utility feeds 514, 515 forms a backup or secondary power source for UPSs 510, 511, similar to that previously described with respect to FIGS. 1-4. Further, fuel cell power system 500 may provide grid support similar to what was previously described with respect to FIGS. 1-4.

During abnormal events, such as a fault at one or more of UPSs 510, 511, DCL 506 may be powered by the remaining UPS 510 or UPS 511, and/or by ring bus 502, similar to that previously described with respect to FIGS. 1-4.

Figure 6:
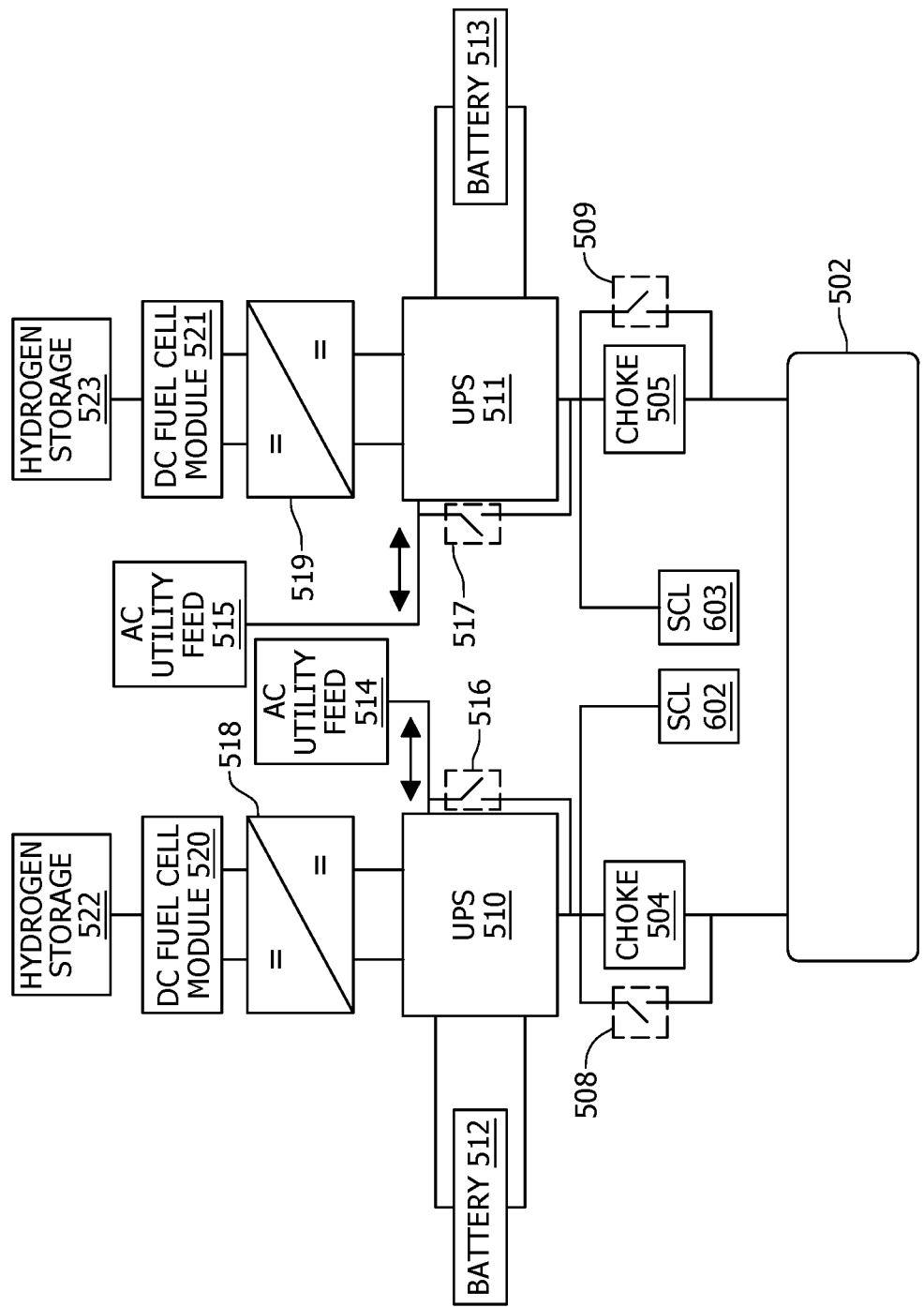
FIG. 6 depicts a block diagram of a fuel cell power system for single-corded AC loads in another exemplary embodiment.

FIG. 6 depicts a block diagram of a fuel cell power system 600 for single-corded AC loads in another exemplary embodiment. Fuel cell power system 600 includes similar components as depicted in FIG. 5 for the fuel cell power system 500, with the exception that UPSs 510, 511 are coupled to SCLs 602, 603.

During normal operation of fuel cell power system 600, DC fuel cell modules 520, 521 utilize hydrogen from hydrogen storage 522, 523, and generate DC power, which is supplied to DC-DC power converters 518, 519. DC-DC power converters 518, 519 convert the DC power supplied by DC fuel cell modules 520, 521 into DC power, which is provided to UPSs 510, 511. UPSs 510, 511 provide AC power to SCLs 602, 603 and also provide AC power to ring bus 502, via chokes 504, 505. Further, fuel cell power system 600 may provide grid support similar to what was previously described with respect to FIGS. 1-4.

During abnormal events, such as a fault at one or more of UPSs 510, 511, SCLs 602, 603 may be powered by the remaining UPS 510 or UPS 511 via ring bus 502, in a manner similar to that previously described with respect to FIG. 2.

Figure 7:
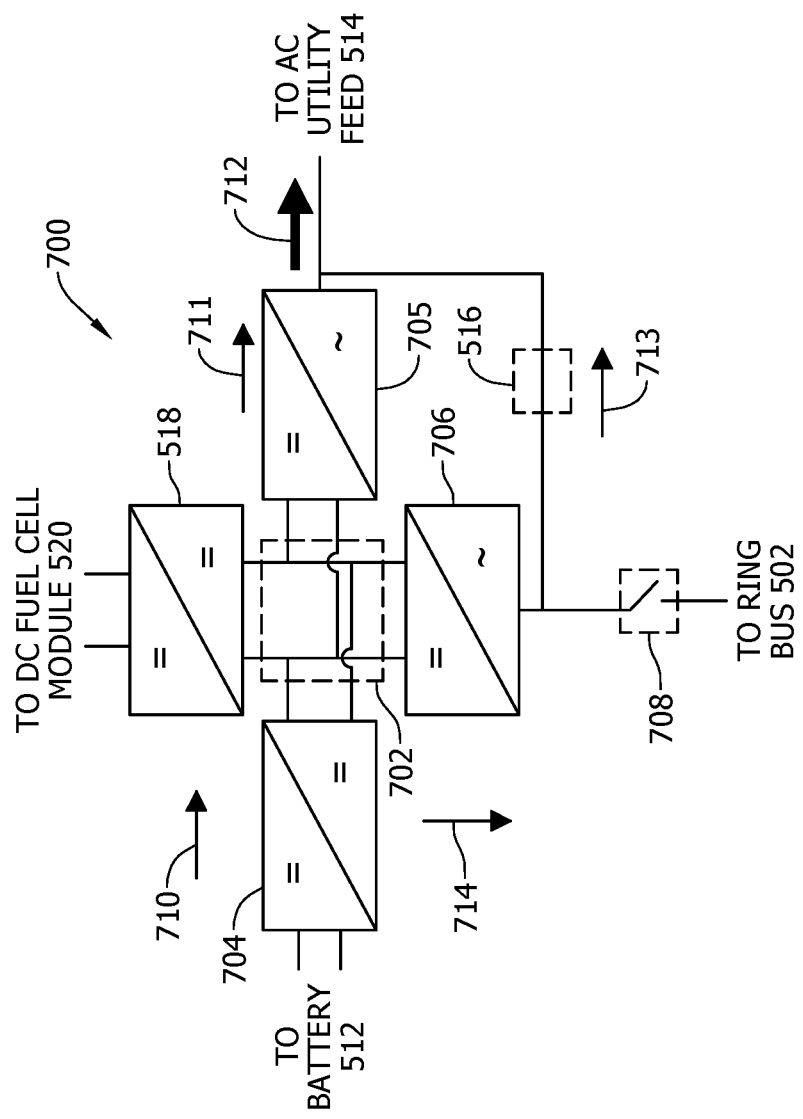
FIG. 7 depicts a block diagram of a power converter topology for a portion of the fuel cell power systems of FIG. 5 and FIG. 6 in an exemplary embodiment.

FIG. 7 depicts a block diagram of a power converter topology 700 for a portion of fuel cell power systems 500, 600 of FIG. 5 and FIG. 6 in an exemplary embodiment. Power converter topology 700 will be described with respect to UPS 510 and DC-DC power converter 518 of FIG. 5 and FIG. 6, although power converter topology 700 applies to UPS 511 and DC-DC power converter 519, and to other parallel strings of UPSs and DC-DC power converters coupled to ring bus 502, not shown.

In this embodiment, power converter topology 700 depicts DC-DC power converter 518, coupled to DC fuel cell module 520 and a common DC bus 702. Power converter topology 700 also depicts DC-DC power converter 704, DC-AC power converter 705, and DC-AC power converter 706, each of which are bidirectional and electrically coupled to common DC bus 702.

Generally, UPS 510 includes DC-DC power converter 704, DC-AC power converter 705, and DC-AC power converter 706, forming a multi-port UPS. DC-DC power converter 704 electrically couples battery 512 to common DC bus 702. DC-AC power converter 705 electrically couples common DC bus 702 to AC utility feed 514. DC-AC power converter electrically couples common DC bus 702 to ring bus 502.

In the embodiment of FIG. 7, UPS 510 is not electrically coupled to ring bus 502, because a circuit breaker 708 is open. UPS bypass circuit breaker 516 is closed. Arrows 710-714 depict the direction of power flow in power converter topology 700. Common DC bus 702 is supplied with DC power from battery 512, via DC-DC power converter 704, and from DC fuel cell module 520, via DC-DC power converter 518. DC-AC power converter 706 implements grid support to AC utility feed 514 via UPS bypass circuit breaker 713, which is closed. Further, DC-AC power converter 705 also implements grid support to AC utility feed 514. When circuit breaker 708 is closed and UPS bypass circuit breaker 516 is open, the grid support operation is similar, although the power flow through DC-AC power converter 706 is reversed (e.g., arrow 714 is reversed).

Figure 8:
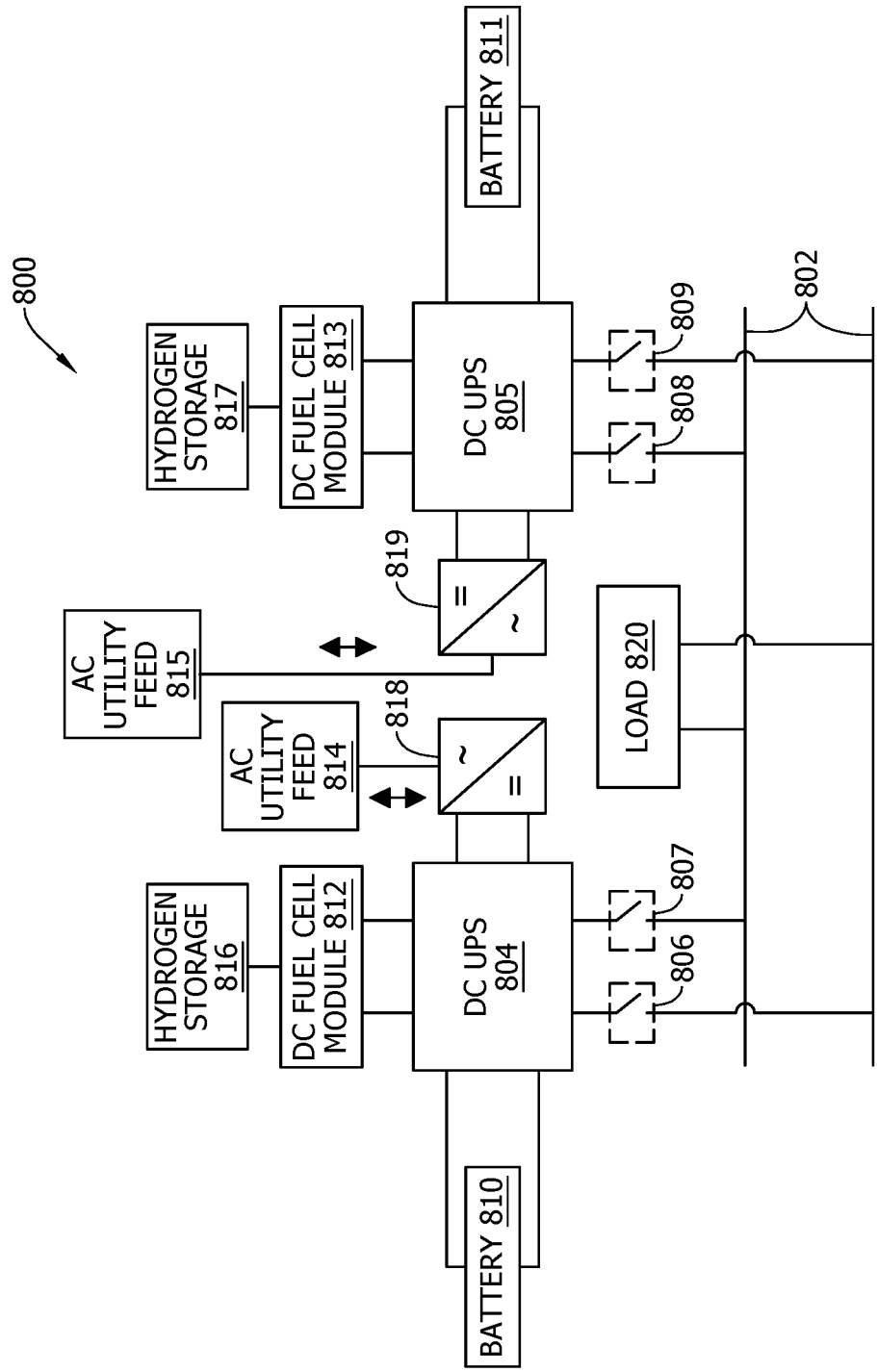
FIG. 8 depicts a block diagram of a fuel cell power system for direct current (DC) loads in an exemplary embodiment.

FIG. 8 depicts a block diagram of a fuel cell power system 800 for DC loads in an exemplary embodiment. In this embodiment, fuel cell power system 800 includes a DC ring bus 802, which is electrically coupled to DC UPSs 804, 805 via circuit breakers 806, 807, 808, 809. In particular, DC ring bus 802 is electrically coupled to DC UPS 804 via circuit breakers 806, 807, and DC ring bus 802 is electrically coupled to DC UPS 805 via circuit breakers 808, 809. In this embodiment, fuel cell power system 800 includes batteries 810, 811, DC fuel cell modules 812, 813, AC utility feeds 814, 815, and hydrogen storage 816, 817, each of which may operate similarly to their corresponding batteries 112, 113, 512, 513, DC fuel cell modules 120, 121, 520, 521, AC utility feeds 114, 115, 514, 515, and hydrogen storage 122, 123, 522, 523 previously described with respect to FIGS. 1-7.

In this embodiment, DC UPSs 804, 805 are electrically coupled to DC fuel cell modules 812, 813, are electrically coupled to DC ring bus 802, and are electrically coupled to DC-AC power converters 818, 819, which are bidirectional.

During normal operation of fuel cell power system 800, DC fuel cell modules 812, 813 utilize hydrogen from hydrogen storage 816, 817, and generate DC power, which is supplied to DC UPSs 804, 805 (e.g., at a first voltage level). DC UPSs 804, 805 provide DC power (e.g., at a second different voltage level) to a load 820, via DC ring bus 802.

During abnormal events, such as a fault at one or more of DC UPSs 804, 805, load 820 may be powered by the remaining DC UPS 804 or DC UPS 805 via DC ring bus 802, by isolating the faulted DC UPSs 804, 805 from DC ring bus 802 by opening the corresponding circuit breakers 806, 807, 808, 809. In some embodiments, circuit breakers (not shown) are located between neighboring segments DC ring bus 802. During a fault at DC ring bus 802, selected circuit breakers will open to isolate the fault.

Figure 9:
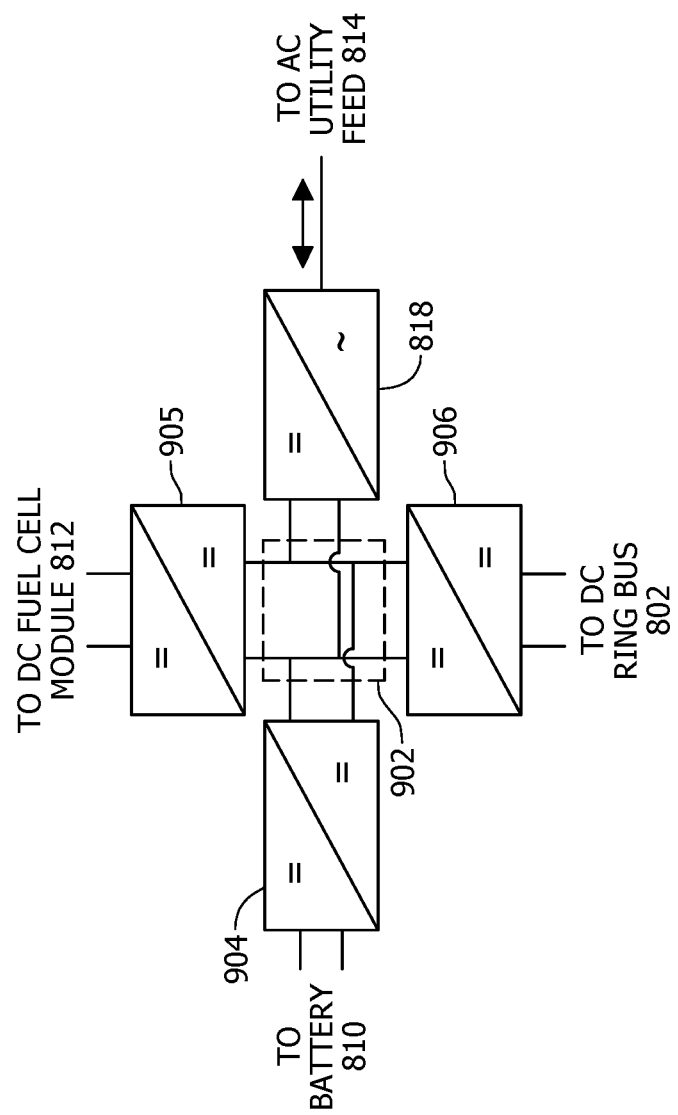
FIG. 9 depicts a block diagram of a power converter topology for the fuel cell power system of FIG. 8 in an exemplary embodiment.

FIG. 9 depicts a block diagram of a power converter topology 900 for a portion of fuel cell power system 800 of FIG. 8 in an exemplary embodiment. Power converter topology 900 will be described with respect to DC UPS 804 and DC-AC power converter 618 of FIG. 8, although power converter topology 900 applies to DC UPS 805 and DC-AC power converter 819, and to other parallel implementations of DC UPSs and DC-AC power converters coupled to DC ring bus 802 and AC utility feeds, not shown, In this embodiment, power converter topology 900 depicts DC-AC power converter 588, coupled to AC utility feed 814, and a common DC bus 902. Power converter topology 900 also depicts DC-DC power converter 904, DC-DC power converter 905, and DC-DC power converter 906, each of which are bidirectional and electrically coupled to common DC bus 902.

Generally, DC UPS 804 includes DC-DC power converter 904, DC-DC power converter 905, and DC-DC power converter 906, forming a multi-port DC UPS. DC-DC power converter 904 electrically couples battery 810 to common DC bus 902, DC-DC power converter 905 electrically couples DC fuel cell module 812 to common DC bus 902, and DC-DC power converter 906 electrically couples common DC bus 902 to DC ring bus 802. In a grid support mode, common DC bus 902 is powered by DC ring bus 802, via DC-DC power converter 906, by battery 810, via DC-DC power converter 904, and by DC fuel cell module 812, via DC-DC power converter 905. AC power is supplied during the grid support mode to AC utility feed 814 via DC-AC power converter 818.

Figure 10:
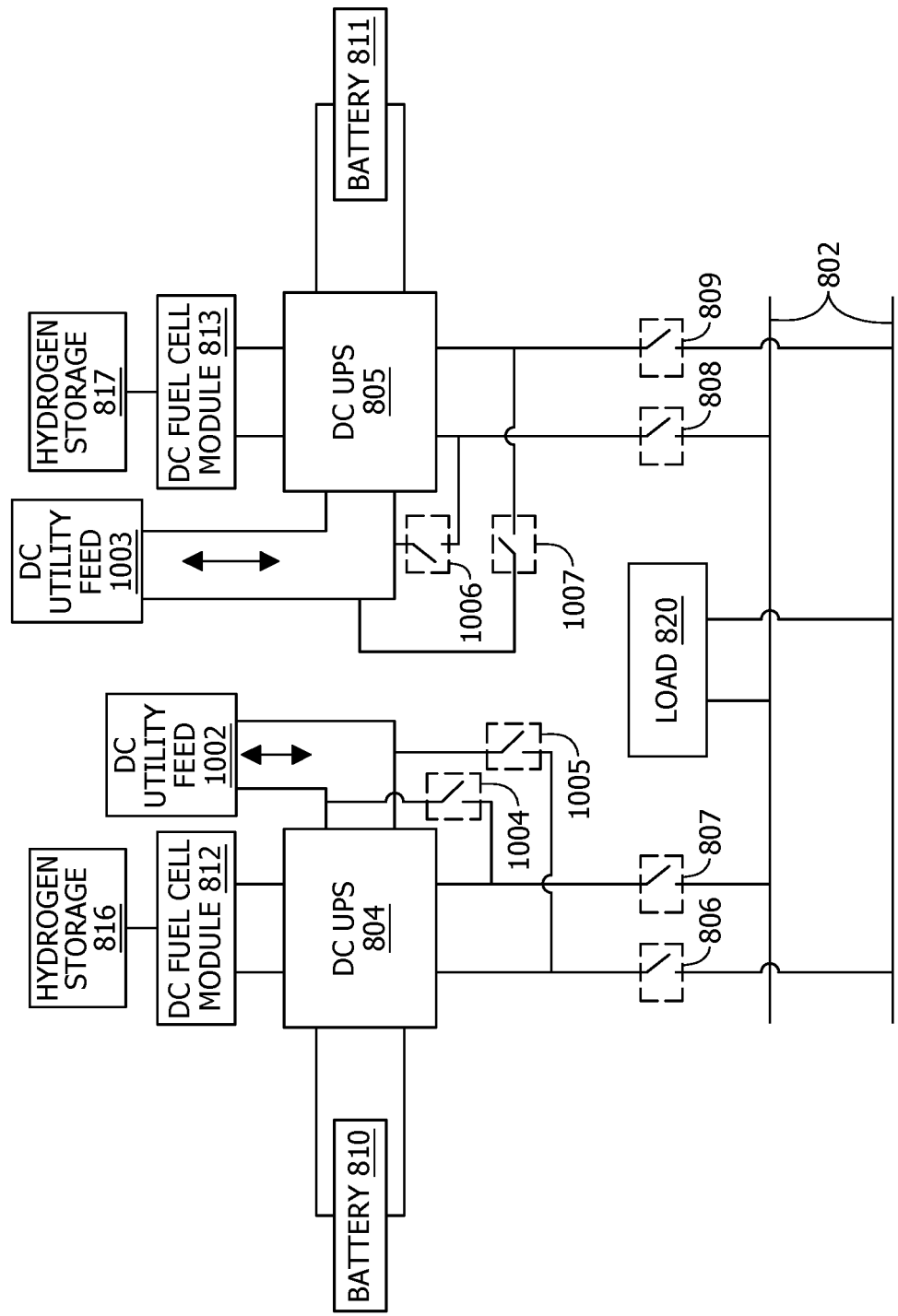
FIG. 10 depicts a block diagram of a fuel cell power system for DC loads in another exemplary embodiment.

FIG. 10 depicts a block diagram of a fuel cell power system 1000 for DC loads in another exemplary embodiment. In this embodiment, fuel cell power system 1000 includes a DC ring bus 802, which is electrically coupled to DC UPSs 804, 805 via circuit breakers 806, 807, 808, 809, all of which may operate similarly to what was previously described with respect to FIG. 8. In this embodiment, fuel cell power system 1000 includes batteries 810, 811, DC fuel cell modules 812, 813, and hydrogen storage 816, 817, each of which may operate similarly to their corresponding batteries 112, 113, 512, 513, DC fuel cell modules 120, 121, 520, 520, and hydrogen storage 122, 123, 522, 523 previously described with respect to FIGS. 1-7 and/or with respect to the same elements described in FIG. 8 and FIG. 9.

In this embodiment, DC UPSs 804, 805 are electrically coupled to DC fuel cell modules 812, 813, are electrically coupled to DC ring bus 802, and are electrically coupled to DC utility feeds 1002, 1003. Further, fuel cell power system 1000 includes UPS bypass circuit breakers 1004, 1005, 1006, 1007. UPS bypass circuit breakers 1004, 1005 selectively couple DC utility feed 1002 to the output of DC UPS 804, and UPS bypass circuit breakers 1006, 1007 selectively coupled DC utility feed 1003 to the output of DC UPS 805.

During normal operation of fuel cell power system 1000, DC fuel cell modules 812, 813 utilize hydrogen from hydrogen storage 816, 817, and generate DC power, which is supplied to DC UPSs 804, 805 (e.g., at a first voltage level). DC UPSs 804, 805 provide DC power (e.g., at a second different voltage level) to a load 820, via DC ring bus 802. In this embodiment, DC fuel cell modules 812, 813 form a primary power source for DC UPSs 804, 805, and DC utility feeds 1002, 1003 form a backup or secondary power source for DC UPSs 804,805.

During abnormal events, such as a fault at one or more of DC UPSs 804, 805, load 820 may be powered by the remaining DC UPS 804 or DC UPS 805 via DC ring bus 802, by isolating the faulted DC UPSs 804, 805 from DC ring bus 802 by opening the corresponding circuit breakers 806, 807, 808, 809. In some embodiments, circuit breakers (not shown) are located between neighboring segments DC ring bus 802. During a fault at DC ring bus 802, selected circuit breakers will open to isolate the fault.

Figure 11:
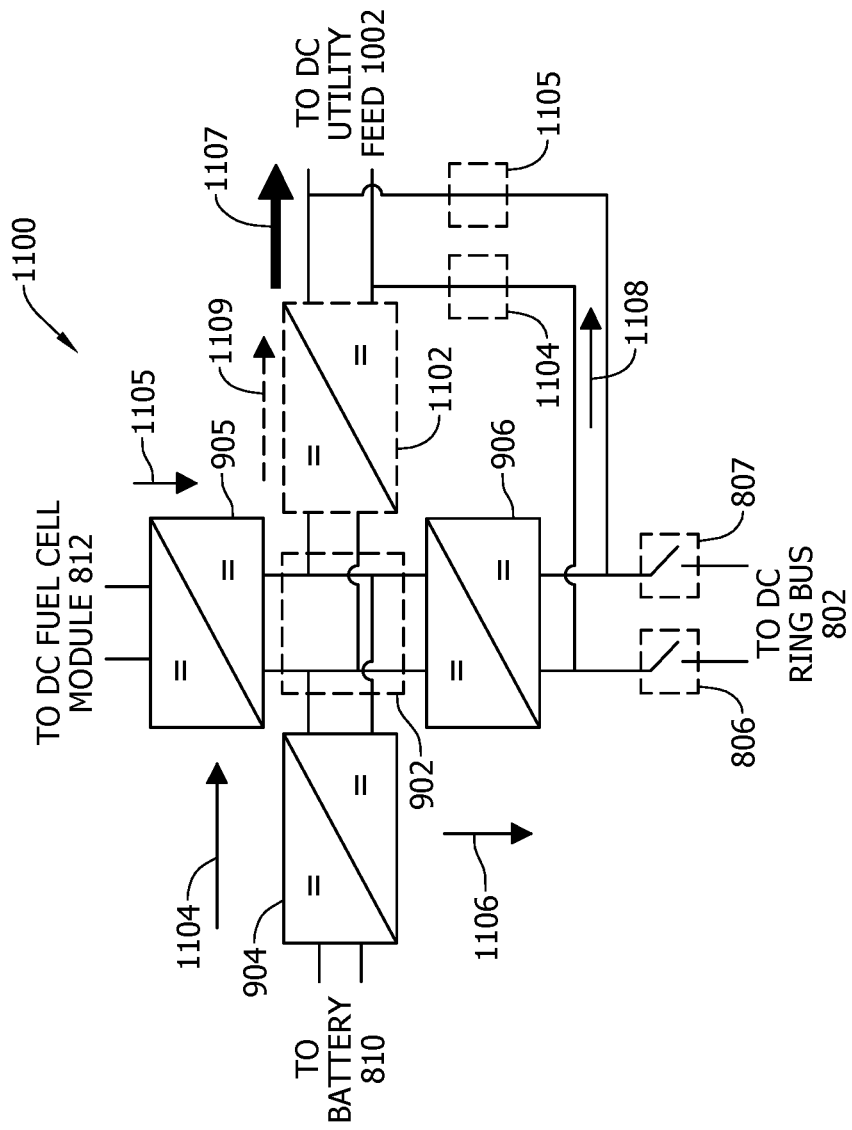
FIG. 11 depicts a block diagram of a power converter topology for the fuel cell power system of FIG. 10 in an exemplary embodiment.

FIG. 11 depicts a block diagram of a power converter topology 1100 for a portion of fuel cell power system 1000 of FIG. 10 in an exemplary embodiment. Power converter topology 1100 will be described with respect to DC UPS 804 of FIG. 10, although power converter topology 1100 applies to DC UPS 805 and to other parallel implementations of DC UPSs coupled to DC ring bus 802 and DC utility feeds, not shown, In this embodiment, power converter topology 1100 depicts that DC UPS 804 includes a DC-DC power converter 1102, which may be optional, coupled to DC utility feed 1002 and a common DC bus 902. DC-DC power converter 1102 may be optionally used, for example, to level shift DC voltages between the voltage at DC utility feed 1002 and the voltage at common DC bus 902 and to provide additional grid support power.

Power converter topology 1100 also depicts DC-DC power converter 904, DC-DC power converter 905, and DC-DC power converter 906, each of which are bidirectional and electrically coupled to common DC bus 902.

Generally, DC UPS 804 includes DC-DC power converter 904, DC-DC power converter 905, and DC-DC power converter 906, and optionally, DC-DC power converter 1102, forming a multi-port DC UPS. DC-DC power converter 904 electrically couples battery 810 to common DC bus 902, DC-DC power converter 905 electrically couples DC fuel cell module 812 to common DC bus 902, and DC-DC power converter 906 electrically couples common DC bus 902 to DC ring bus 802.

In the embodiment of FIG. 11, DC UPS 804 is not electrically coupled to DC ring bus 802, because circuit breakers 806, 807 are open. UPS bypass circuit breakers 1004, 1005 are closed. Arrows 1104-1109 depict the direction of power flow in power converter topology 1100 (arrow 1109 is optional, depending on whether DC-DC power converter 1102 is present). Common DC bus 902 is supplied with DC power from battery 810, via DC-DC power converter 904, and from DC fuel cell module 812, via DC-DC power converter 905. DC-DC power converter 906 implements grid support to DC utility feed 1002 via UPS bypass circuit breakers 1104, 1105, which are closed. When circuit breakers 806, 807 are closed and UPS bypass circuit breakers 1004, 1005 are open, the grid support operation is similar, although the power flow through DC-DC power converter 906 is reversed (e.g., arrow 1106 is reversed).

An example technical effect of the embodiments described herein includes at least one of: (a) increasing the reliability of ring bus architectures using DC fuel cell modules as the primary power source; (b) selectively providing grid support using the DC fuel cell modules while maintaining the reliability of the ring bus; and (c) implementing hydrogen regeneration at the DC fuel cell modules during off-peak rate periods.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel cell power system comprising:
   a ring bus;
   a plurality of bidirectional uninterruptable power supplies (UPSs), each electrically coupled to at least one battery, an alternating current (AC) utility feed, a load, and via a choke, the ring bus;
   a plurality of direct current (DC) fuel cell modules, each including one or more fuel cells coupled to a hydrogen storage; and
   a plurality of bidirectional DC-AC power converters, each electrically coupled to a corresponding one of the plurality of DC fuel cell modules and a corresponding one of the plurality of bidirectional UPSs at the AC utility feed.

2. The fuel cell power system of claim 1, wherein:
   the plurality of DC fuel cell modules comprise a primary power source for the ring bus and the AC utility feed comprises a backup power source for the ring bus.

3. The fuel cell power system of claim 1, wherein:
   at least one of the plurality of bidirectional UPSs and a corresponding one of the plurality of DC-AC bidirectional power converters is configured to provide AC electrical power to the AC utility feed in response to a trigger.

4. The fuel cell power system of claim 1, further comprising:
   a choke bypass circuit breaker in parallel with the choke.

5. The fuel cell power system of claim 1, further comprising:
   a plurality of UPS bypass circuit breakers, each in parallel with one of the plurality of bidirectional UPSs.

6. The fuel cell power system of claim 5, wherein:
   at least one of the plurality of bidirectional UPSs further comprises:
   a rectifier electrically coupling the at least one battery with the AC utility feed; and
   an inverter electrically coupling the at least one battery with the load, and via the choke, the ring bus,
   the battery is configured to provide, via the rectifier, AC power to the AC utility feed, and
   the battery is further configured to provide, via the inverter, the AC power to the AC utility feed when a corresponding one of the plurality of UPS bypass circuit breakers is closed.

7. The fuel cell power system of claim 1, wherein:
   at least one of the plurality of DC fuel cell modules is configured to generate hydrogen for the hydrogen storage in response to receiving DC electrical power from a corresponding one of the plurality of bidirectional DC-AC power converters.

8. The fuel cell power system of claim 1, wherein:
   the load is a dual-corded load and is electrically connected to at least two of the plurality of bidirectional UPSs.

9. The fuel cell power system of claim 1, wherein:
   the load is a single-corded load and is electrically connected to only one of the plurality of bidirectional UPSs.

10. The fuel cell power system of claim 1, wherein:
each of the plurality of bidirectional UPSs includes a corresponding one of the plurality of bidirectional DC-AC power converters.

11. A fuel cell power system comprising:
a ring bus;
a plurality of bidirectional uninterruptable power supplies (UPSs), each electrically coupled to at least one battery, an AC utility feed, a load, and via a choke, to the ring bus;
a plurality of direct current (DC) fuel cell modules, each including one or more fuel cells coupled to a hydrogen storage; and
a plurality of bidirectional DC-DC power converters, each electrically coupled to a corresponding one of the plurality of DC fuel cell modules and a corresponding one of the plurality of bidirectional UPSs.

12. The fuel cell power system of claim 11, wherein:
the plurality of DC fuel cell modules comprises a primary power source for the ring bus and the AC utility feed comprises a backup power source for the ring bus.

13. The fuel cell power system of claim 11, wherein:
at least one of the plurality of bidirectional UPSs is configured to provide AC electrical power to the AC utility feed in response to a trigger.

14. The fuel cell power system of claim 11, further comprising:
a choke bypass circuit breaker in parallel with the choke.

15. The fuel cell power system of claim 11, further comprising:
a plurality of UPS bypass circuit breakers, each in parallel with one of the plurality of bidirectional UPSs.

16. The fuel cell power system of claim 11, wherein:
at least one of the plurality of DC fuel cell modules is configured to generate hydrogen for the hydrogen storage in response to receiving DC electrical power from a corresponding one of the plurality of bidirectional DC-DC power converters.

17. The fuel cell power system of claim 11, wherein:
the load is a dual-corded load and is electrically connected to at least two of the plurality of bidirectional UPSs.

18. The fuel cell power system of claim 11, wherein:
the load is a single-corded load and is electrically connected to only one of the plurality of bidirectional UPSs.

19. A fuel cell power system comprising:
a direct current (DC) ring bus;
a plurality of DC fuel cell modules, each including one or more fuel cells coupled to a hydrogen storage; and
a plurality of bidirectional DC uninterruptable power supplies (DC-UPSs), each electrically coupled to at least one battery, a corresponding one of the plurality of DC fuel cell modules, and, via the DC ring bus, a load.

20. The fuel cell power system of claim 19, further comprising:
a plurality of bidirectional DC to alternating current (DC-AC) power converters, each electrically coupled to a corresponding one of the plurality of bidirectional DC-UPSs and an AC utility feed,
wherein the plurality of DC fuel cell modules comprises a primary power source for the DC ring bus, and
wherein the AC utility feed comprises a secondary power source for the DC ring bus.

\* \* \* \* \*